(12) United States Patent
Rothman et al.

(10) Patent No.: US 7,890,811 B2
(45) Date of Patent: Feb. 15, 2011

(54) METHOD AND APPARATUS FOR IMPROVED MEMORY RELIABILITY, AVAILABILITY AND SERVICEABILITY

(75) Inventors: Michael A. Rothman, Puyallup, WA (US); Vincent J. Zimmer, Federal Way, WA (US); Fernando A. Lopez, Hillsboro, OR (US); Robert C. Swanson, Tacoma, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 11/771,994

(22) Filed: Jun. 29, 2007

(65) Prior Publication Data

US 2009/0006837 A1    Jan. 1, 2009

(51) Int. Cl.
*G06F 11/00* (2006.01)
(52) U.S. Cl. .......................................... 714/42; 714/710
(58) Field of Classification Search .................... 714/42, 714/710
See application file for complete search history.

(56) References Cited

U.S. PATENT DOCUMENTS

| 7,523,364 | B2 * | 4/2009 | Alves et al. ................. 714/710 |
| 2002/0188897 | A1 * | 12/2002 | Ruckerbauer et al. ....... 714/710 |
| 2009/0006900 | A1 * | 1/2009 | Lastras-Montano et al. ... 714/42 |

* cited by examiner

*Primary Examiner*—Michael C Maskulinski
(74) *Attorney, Agent, or Firm*—Caven & Aghevli LLC

(57) ABSTRACT

Methods and apparatus dynamically reconfigure storage or channel capacities in a memory system. A fully-buffered dual in-line memory module (DIMM) is configured for a particular storage capacity and a particular channel capacity. An error may be detected at a memory address in some portion of the DIMM. To resolve the problem, the storage capacity or the channel capacity may be reduced and the DIMM may be dynamically reconfigured according to the reduced capacity. For one embodiment the DIMM may be reconfigured by mapping the portion of the DIMM containing the error as unavailable and taking that portion off-line without taking the entire DIMM off-line. For another embodiment the DIMM may be reconfigured by throttling the DIMM at a reduced frequency. The portion of the DIMM containing the error may be retested at the reduced frequency. If no errors are detected, the DIMM may be made available at the reduced frequency.

12 Claims, 4 Drawing Sheets

METHOD AND APPARATUS FOR IMPROVED MEMORY RELIABILITY, AVAILABILITY AND SERVICEABILITY

FIELD OF THE DISCLOSURE

This disclosure relates generally to the field of computer memory systems. In particular, the disclosure relates to techniques for improving the utilization of memories and the dynamic handling of memory failures.

BACKGROUND OF THE DISCLOSURE

In computer systems when there is a need for increased data storage capacity, such as in a search engine server, or in computer systems dedicated to storage-intensive tasks such as editing of video or audio, stock market exchange servers, or air traffic control systems, machines may be deployed with many gigabytes of main memory storage. The systems may also include features that help them to stay operational for long periods of time without crashing, and to detect, tolerate or recover from faults and/or memory failures. Such features are often referred to as Reliability, Availability and Serviceability (RAS) features.

Often, such systems may make use of improved main memory storage designs which incorporate industry-standard DIMMs. The acronym DIMM stands for a Dual In-line Memory Module, typically having a 64-bit data path for access via an internal 64-bit memory bus. A DIMM comprises a series of random access memory (RAM) integrated circuits (ICs) mounted on a printed circuit board. One type of DIMM, known as a fully buffered DIMM (FB-DIMM) also has a device called an Advanced Memory Buffer (AMB). FB-DIMMs can be connected via high speed serial interfaces to a Memory Controller Hub (MCH). The AMB communicates with the MCH via the high speed serial interfaces and with RAM ICs on the DIMM via the internal memory bus. The AMB reads from and writes to the RAM as instructed by the MCH and can also be used to configure the FB-DIMM.

Typically when DIMMs are initialized in main memory storage systems, testing is performed to detect any errors. If errors are detected in a particular DIMM, that DIMM may be dynamically disabled. One drawback to such a scheme is that the detection an error in one particular bank of memory on a DIMM may require disabling of an entire DIMM, which can have a capacity for storing gigabytes of data and a cost in thousands of dollars. The DIMM may also represent a significant fraction of the storage capacity for the entire main memory storage system.

It would be desirable to utilize programmable features of an MCH and/or an AMB to alleviate such drawbacks and to improve the dynamic handling of memory failures and the utilization of memories that incorporate industry-standard DIMMs. To date, the advantages of such programmable features of the MCH and/or the AMB have not been fully utilized.

BRIEF DESCRIPTION OF THE DRAWINGS

The present invention is illustrated by way of example and not limitation in the figures of the accompanying drawings.

DETAILED DESCRIPTION

Disclosed herein are processes and apparatus for dynamically reconfiguring storage or channel capacities in a memory system. A fully-buffered dual in-line memory module (DIMM) is configured according to a particular storage capacity and a particular channel capacity. An error may be detected at a memory address in some portion of the DIMM. To resolve the problem, the storage capacity or the channel capacity may be reduced and the DIMM may be dynamically reconfigured according to the reduced capacity. For one embodiment the DIMM may be reconfigured by mapping the portion of the DIMM containing the error as unavailable and taking that portion off-line without taking the entire DIMM off-line. For another embodiment the DIMM may be reconfigured by throttling the DIMM at a reduced frequency. The portion of the DIMM containing the error may be retested at the reduced frequency. If no errors are detected, the DIMM may be made available at the reduced frequency.

By employing embodiments of the disclosed processes and apparatus through programmable features of an advanced memory buffer (AMB) and/or of a memory controller hub MCH, reductions in costs, improved dynamic handling of memory failures and utilization may be realized for memories that incorporate industry-standard DIMMs.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Some embodiments of the disclosed processes and apparatus may use an Intel® Active Management Technology (AMT) device to access programmable features of an AMB and/or of an MCH through the System Management Bus (SMBus). Alternative embodiments of the disclosed processes and apparatus may use platform firmware to access programmable features of an AMB and/or of an MCH through abstract Peripheral Component Interconnect (PCI) or chipset registers. In the following discussion, some known structures, circuits, architecture-specific features and the like have not been shown in detail to avoid unnecessarily obscuring the present invention.

Figure 1:
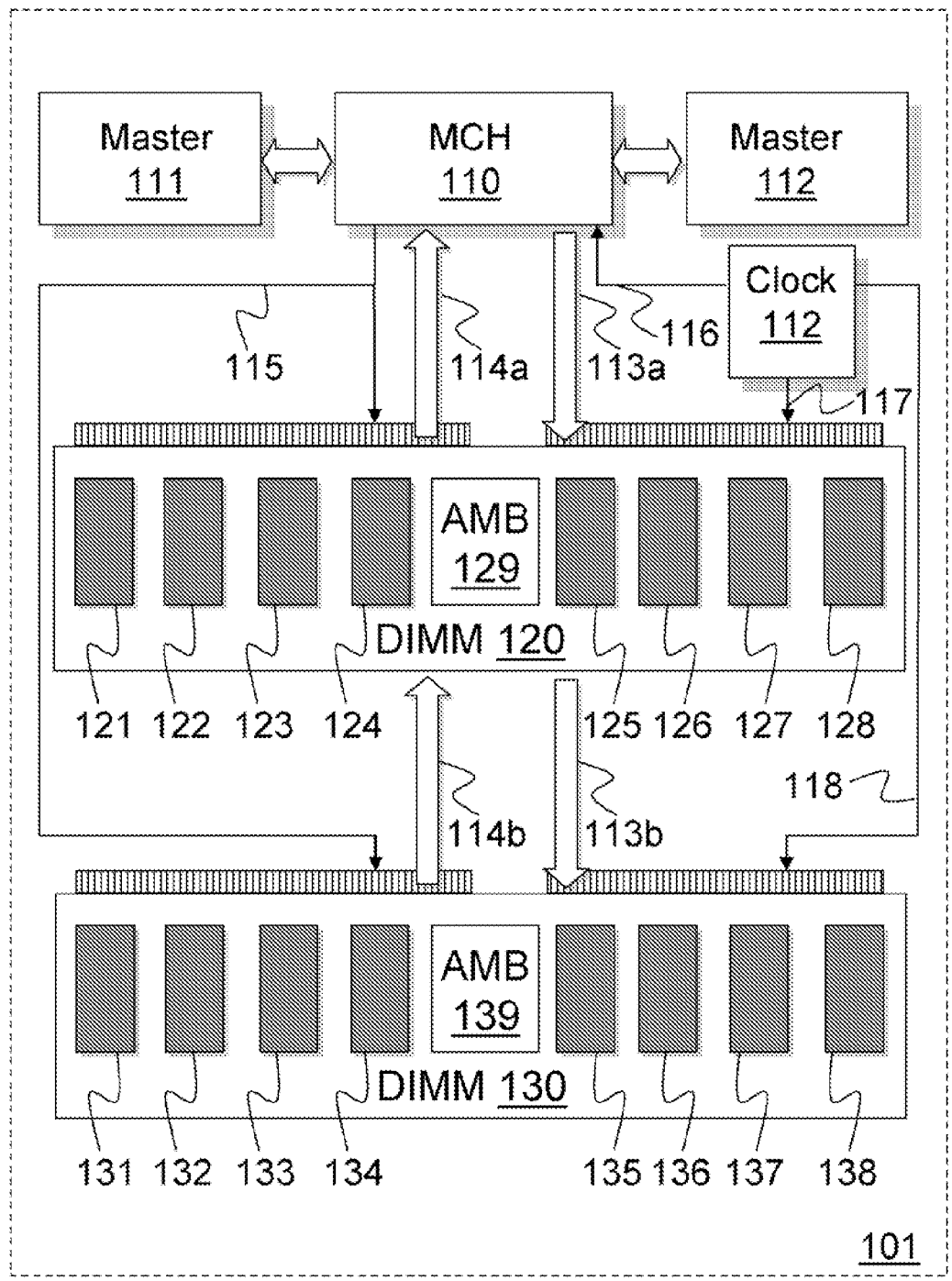
FIG. 1 illustrates one embodiment of a system for dynamic handling of memory failures and reconfiguring the storage capacity or the channel capacity of a DIMM for improved memory utilization.

FIG. 1 illustrates one embodiment of a system 101 for dynamic handling of memory failures and reconfiguring the storage capacity or the channel capacity of the DIMM for improved memory utilization. System 101 includes memory controller hub, MCH 110 and bus masters 111 and 112. Some embodiment of MCH 110 are operatively coupled with DIMMs 120 through 130 to transmit memory access requests as transactions over a point-to-point interface to DIMMs 120 through 130, while other embodiments may use a shared parallel interface. Bus 115, in some embodiments may comprise an SMBus to access programmable features of AMBs 129 through 139 and/or MCH 110. Embodiments of interfaces 114a through 114b and 113a through 113b may respectively comprise fourteen (14) northbound bit lanes carrying data from DIMMs 120 through 130 to the bus masters 111 and 112, and ten (10) southbound bit lanes carrying commands and data from the bus masters 111 and 112 to DIMMs 120 through 130. It will be appreciated that, while two DIMMs 120 and 130 are illustrated in system 101, one or three or four or eight or more DIMMS may be employed in alternative embodiments.

Some embodiments of memory DIMM 120 are fully buffered DIMMs (FB-DIMMs) including an advanced memory buffer AMB 129 and random access memory (RAM) integrated circuits (ICs) 121-128. Similarly, some embodiments of memory DIMM 130 are FB-DIMMs including AMB 139 and RAM ICs 131-138. For some embodiments, memory DIMM 120 and memory DIMM 130 are configured, respectively, according to a typical non-zero storage capacity and a typical non-zero channel capacity. For example, a memory DIMM may be configured according to a particular storage capacity up to a maximum 512MB, 1 GB, 2 GB, 4 GB, etc. A memory DIMM may be configured according to a particular channel capacity to transfer data at maximum single-data rates of 66-1.33 MHz, or alternatively to transfer data at effective clock rates of 200-600 MHz (for a single clock bandwidth of 100-300 MHz) in accordance with double-data-rate (DDR) standards, or at effective rates of 400-1066 MHz (single clock 200-533 MHz) in accordance with a double-data-rate two (DDR2) standards, or at effective rates of 800-1600 MHz (single clock 400-800 MHz) in accordance with a double-data-rate three (DDR3) standards. It will be appreciated that as devices get smaller, new standards evolve and clock rates increase, available storage capacities and channel capacities will also increase.

In the operation of system 101, during platform initialization or as the result of a fault following a request for a memory address from bus master 111 and/or from bus master 112, a memory error may be detected for a memory address in some portion of DIMM 120 or in some portion of DIMM 130. In one embodiment, where DIMM 120 and/or DIMM 130 are configured according to a particular storage capacity, that storage capacity may be reduced to determine another non-zero capacity that does not include the portion of the DIMM containing the memory address where the memory error was detected. For example, if the memory error was detected in RAM IC 132 of DIMM 130, which may have initially been configured to a storage capacity of 4 GB, the storage capacity of DIMM 130 may be reduced by 512 MB (or the storage capacity of RAM IC 132). Then DIMM 130 may be dynamically reconfigured according to the reduced capacity without taking the entire DIMM off-line by mapping the portion (e.g. RAM: IC 132) of the DIMM containing the address or addresses where the memory error was detected as unavailable and taking only that portion off-line (e.g. through use of a hot-removal feature of the memory components). It will be appreciated that MCH 110 may be programmed to perform such dynamic reconfigurations of memory DIMM 120 and memory DIMM 130. Thus a reduced, but significant non-zero storage capacity of the DIMM can remain available at its full channel capacity.

In an alternative embodiment, where DIMM 120 and/or DIMM 130 are configured according to a particular channel capacity, that channel capacity may be reduced to determine another non-zero channel capacity. For example, if the memory error was detected in some portion of DIMM 130, which may have initially been configured to an initial channel capacity, say of DDR2-1066 (i.e. 8.5 GB/s at a single clock speed of 533 MHz), the channel capacity of DIMM 130 may be reduced to DDR2-800 (i.e. 6.4 GB/s) by throttling DIMM 130 at a reduced frequency of 400 MHz. The portion of the DIMM 130 containing the memory address where the memory error was detected could then be retested at the reduced frequency of 400 MHz and upon successful retesting, DIMM 130 could be made available on-line at this reduced frequency. Thus the maximum usable storage capacity of the DIMM can remain available at a reduced channel capacity.

It will be appreciated that employing embodiments of the disclosed techniques through the programmable features of AMB 129, AMB 139 and/or of MCH 110, reductions in costs, improved dynamic handling of memory failures and utilization may be realized for embodiments of system 101 memories that incorporate industry-standard DIMMs.

Figure 2:
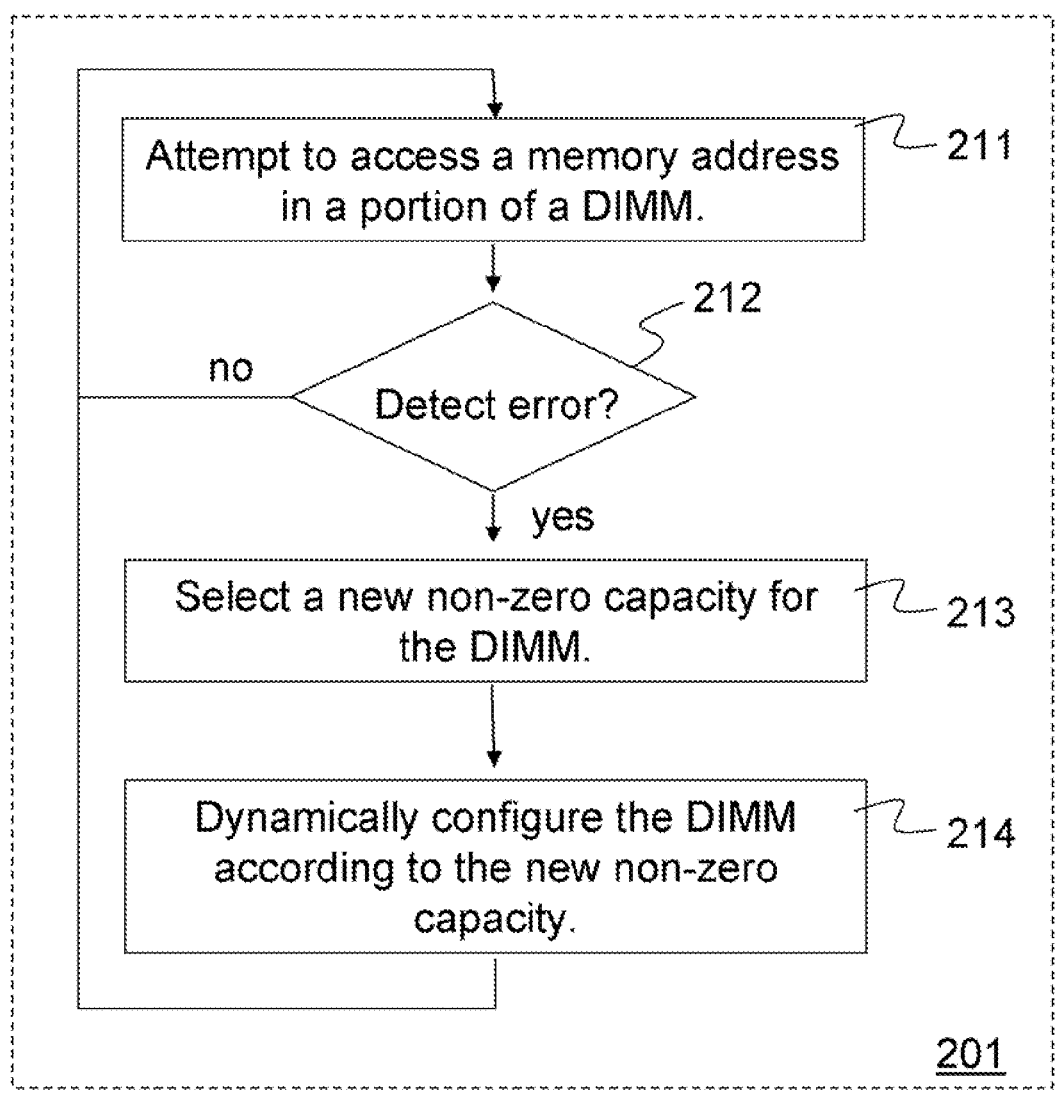
FIG. 2 illustrates a flow diagram for one embodiment of a process to dynamically handle memory failures and reconfigure the storage capacity or the channel capacity of a DIMM to improve memory utilization.

FIG. 2 illustrates a flow diagram for one embodiment of a process 201 to dynamically handle memory failures and improve memory utilization. Process 201 and other processes herein disclosed are performed by processing blocks that may comprise dedicated hardware or software or firmware operation codes executable by general purpose machines or by special purpose machines or by a combination of both.

In processing block 211 an attempt is made to access a memory address in a portion of a DIMM, for example, by MCH 110 of system 101. The portion may be one of the RAM ICs 121-128 of DIMM 120 or one of one of the RAM ICs 131-138 of DIMM 130. In processing block 212 a determination is made if an error has been detected, for example, during memory initialization, or as a memory page fault during continued operation. For some embodiments, the determination may be made in MCH 110 or alternatively in AMB 129 and/or in AMB 139. If no error has been detected, then processing may continue repeating processing block 211.

In processing block 212, if an error has been detected, then processing is directed to proceed in processing block 213 where a reduced non-zero capacity is selected for dynamically reconfiguring the storage or channel capacity of the DIMM. For some embodiments, when an error has been detected, for example, in one of the RAM ICs 121-128 of DIMM 120 or one of one of the RAM ICs 131-138 of DIMM 130, that portion of the DIMM containing the memory address where the error was detected may be mapped as unavailable and that portion may be taken off-line, without taking the entire DIMM off-line. Some embodiments may employ a facility for hot-addition and/or for hot-removal of memory components, to dynamically reconfigure the storage capacity of the DIMM in processing block 214. For some alternative embodiments, when an error has been detected, a reduced channel capacity may be selected wherein the DIMM may be throttled at a reduced clock frequency for retesting that portion of the DIMM containing the memory address where the error was detected and if successful, dynamically reconfiguring the channel capacity of the DIMM in processing block 214 by making it available on-line at the reduced frequency.

It will be appreciated that especially when a DIMM may have a capacity for storing gigabytes of data, cost thousands of dollars, and represents a significant fraction of the storage capacity for the entire memory storage system, dynamic handling of memory failures in such a way as to permit the DIMM to remain available at a reduced non-zero storage or at a reduced non-zero channel capacity can potentially reduce operating costs and improve memory utilization for the system.

Figure 3A:
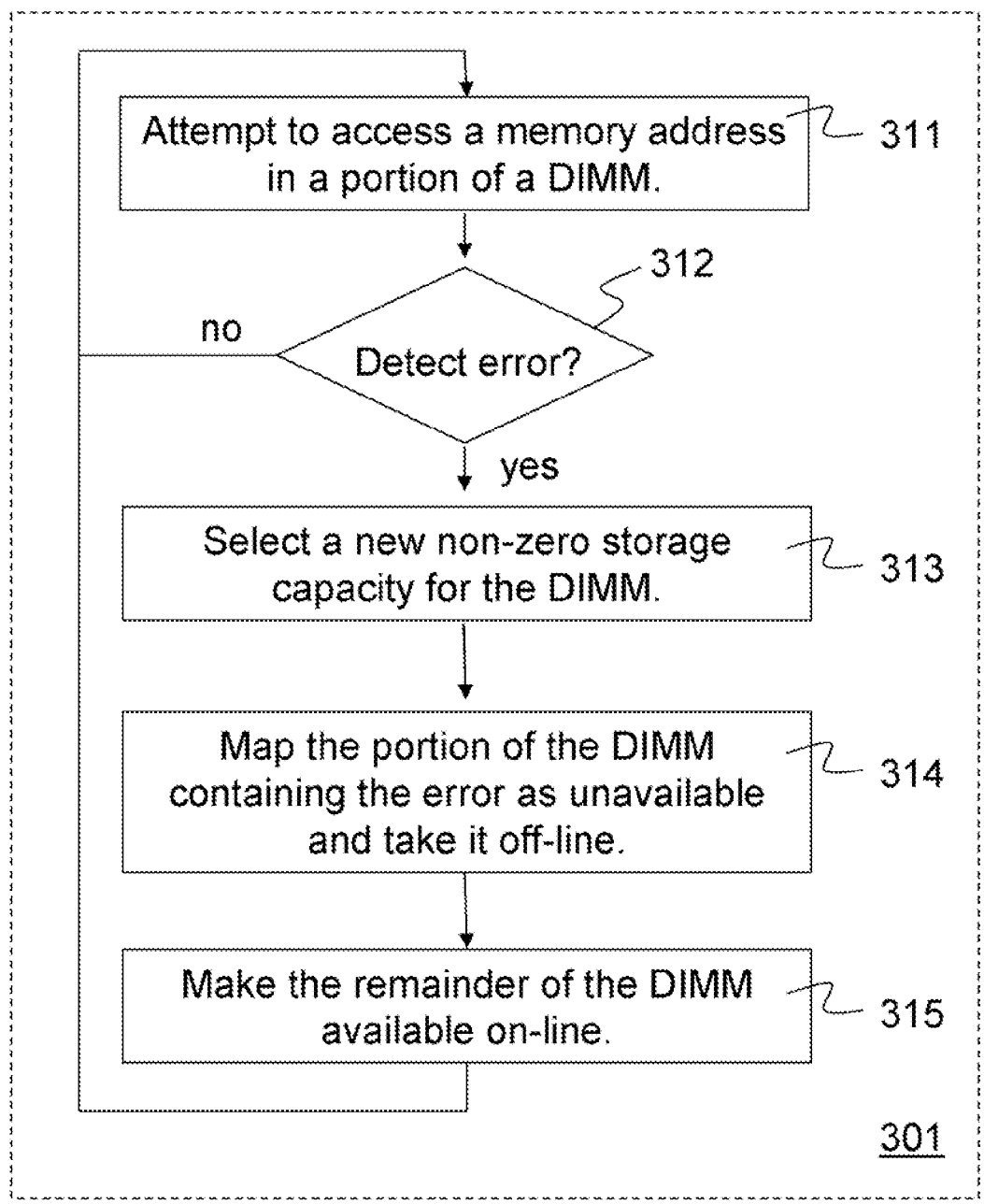
FIG. 3a illustrates a flow diagram for one alternative embodiment of a process to dynamically handle memory failures and reconfigure the storage capacity of a DIMM to improve memory utilization.

FIG. 3a illustrates a flow diagram for one alternative embodiment of a process 301 to dynamically handle memory failures and reconfigure the storage capacity of a DIMM to improve memory utilization. In processing block 311 an attempt is made to access a memory address in a portion of a DIMM, such as one of the RAM ICs 121-128 of DIMM 120 or one of one of the RAM ICs 131-138 of DIMM 130. In processing block 312 a determination is made if an error has been detected, for example, in MCH 110 or alternatively in AMB 129 and/or in AMB 139. If no error has been detected, then processing may continue repeating processing block 311.

In processing block 312, if an error has been detected, then processing is directed to proceed in processing block 313 where a reduced non-zero storage capacity is selected for dynamically reconfiguring the storage capacity of the DIMM. In processing block 314, when an error has been detected, say in one of the RAM ICs 121-128 of DIMM 120 or one of one of the RAM ICs 131-138 of DIMM 130, that portion of the DIMM containing the memory address where the error was detected is mapped as unavailable and taken off-line, without taking the entire DIMM off-line. Then in processing block 315 the remaining storage capacity of the DIMM is made available on-line.

Figure 3B:
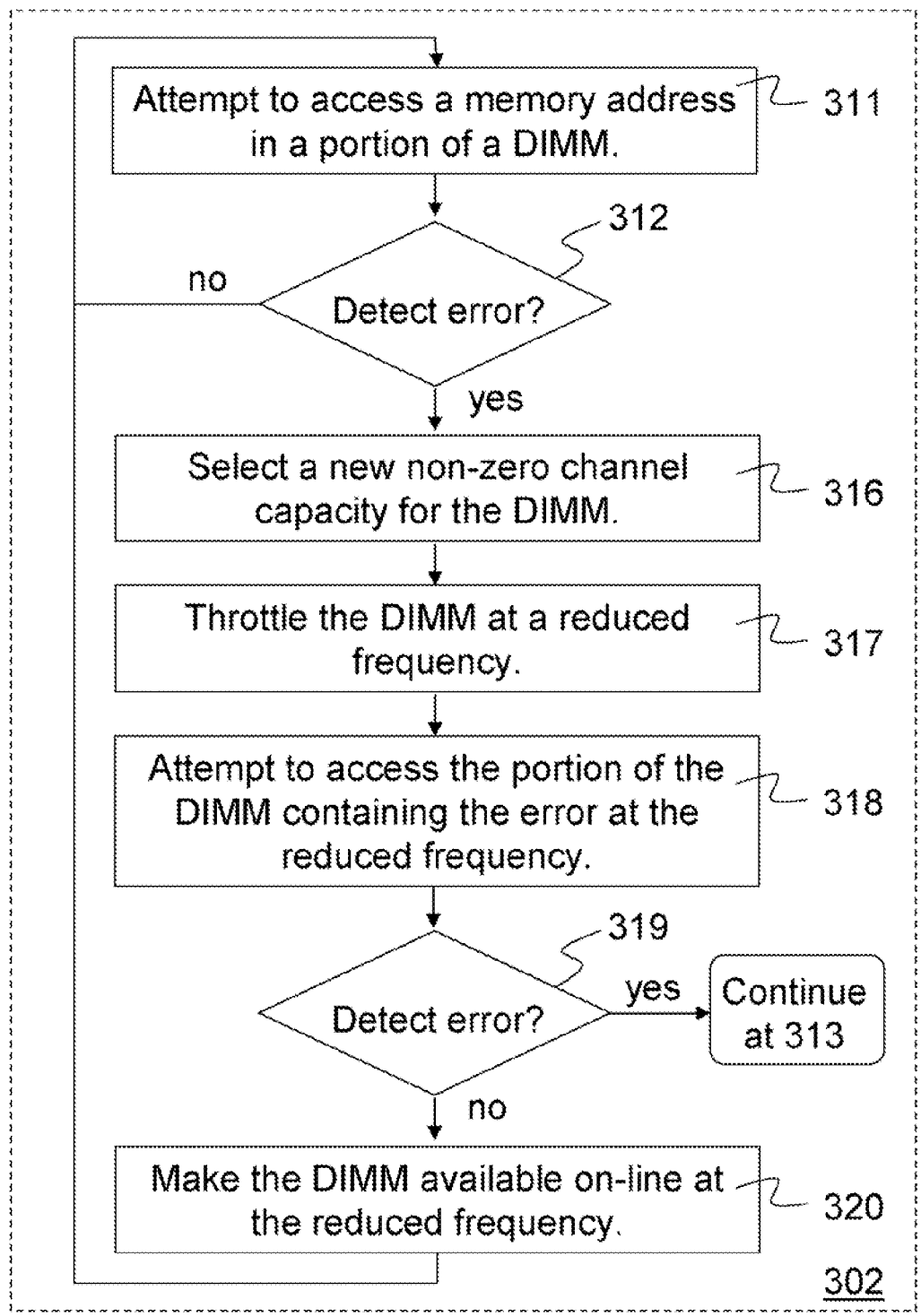
FIG. 3b illustrates a flow diagram for another alternative embodiment of a process to dynamically handle memory failures and reconfigure the channel capacity of a DIMM to improve memory utilization.

FIG. 3b illustrates a flow diagram for another alternative embodiment of a process 302 to dynamically handle memory failures and reconfigure the channel capacity of a DIMM to improve memory utilization. Again, in processing block 311 an attempt is made to access a memory address in a portion of a DIMM and a determination is made if an error has been detected in processing block 312. If no error has been detected, then processing may continue repeating processing block 311.

Otherwise if an error has been detected, then processing is directed to proceed in processing block 316 where a reduced non-zero channel capacity is selected for dynamically reconfiguring the channel capacity of the DIMM. In processing block 317, if the memory error was detected in some portion of a DIMM, which was configured to an initial channel capacity, the channel capacity of the DIMM is reduced by throttling the DIMM 130 at a reduced frequency in accordance with the reduced non-zero channel capacity selected. Then in processing block 318, another attempt is made to access the portion of the DIMM containing the memory address where the memory error was detected at the reduced frequency and a determination is made if an error has been detected in processing block 319. In processing block 319, if an error has been detected, then processing is directed to proceed in processing block 313 where a reduced non-zero storage capacity is selected for dynamically reconfiguring the storage capacity of the DIMM. Otherwise, upon successful retesting, the DIMM is made available on-line at the reduced frequency in processing block 320.

Thus a reduced, but significant non-zero storage capacity of the DIMM can remain available at its full channel capacity or alternatively the maximum usable storage capacity of the DIMM can be made available at a reduced channel capacity without taking the DIMM off-line. It will be appreciated that embodiments of the disclosed techniques using programmable features of an AMB and/or an MCH may provide reductions in costs, improved dynamic handling of memory failures and memory utilization in systems that incorporate industry-standard DIMMs.

The above description is intended to illustrate preferred embodiments of the present invention. From the discussion above it should also be apparent that especially in such an area of technology, where growth is fast and further advancements are not easily foreseen, the invention can be modified in arrangement and detail by those skilled in the art without departing from the principles of the present invention within the scope of the accompanying claims and their equivalents.

What is claimed is:

1. A method for dynamically reconfiguring storage or channel capacities in a memory system, the method comprising:
   detecting a memory error for a memory address in a portion of a dual in-line memory module (DIMM) configured according to a first non-zero capacity;
   reducing the first non-zero capacity to determine a second non-zero capacity;
   dynamically configuring the DIMM according to said second non-zero capacity, wherein said first and second non-zero capacities represent alternative channel capacities of the DIMM.

2. The method of claim 1 wherein said first and second non-zero capacities represent alternative data storage capacities of the DIMM.

3. The method of claim 2 wherein dynamically configuring the DIMM according to said second non-zero capacity, is accomplished by:
   mapping the portion of the DIMM containing the memory address where the memory error was detected as unavailable; and
   taking said portion, but not the entire DIMM off-line.

4. The method of claim 1 wherein dynamically configuring the DIMM according to said second non-zero capacity, is accomplished by:
   throttling the DIMM at a reduced frequency;
   retesting, at said reduced frequency, the portion of the DIMM containing the memory address where the memory error was detected; and upon successful retesting
   making the DIMM available on-line at said reduced frequency.

5. An article of manufacture to dynamically reconfigure storage or channel capacities, the article comprising a non-transitory machine readable tangible medium including a program, said program being executable by a machine to perform a method comprising:
   detecting a memory error for a memory address in a portion of a dual in-line memory module (DIMM) configured according to a first non-zero capacity;
   reducing the first non-zero capacity to determine a second non-zero capacity;
   causing a memory controller to dynamically reconfigure the DIMM according to said second non-zero capacity, wherein said first and second non-zero capacities represent alternative channel capacities of the DIMM.

6. The article of claim 5 wherein said first and second non-zero capacities represent alternative data storage capacities of the DIMM.

7. The article of claim 6 wherein causing the memory controller to dynamically reconfigure the DIMM according to said second non-zero capacity, is accomplished by:
   mapping the portion of the DIMM containing the memory address where the memory error was detected as unavailable; and
   taking said portion, but not the entire DIMM off-line.

8. The article of claim 5 wherein causing the memory controller to dynamically reconfigure the DIMM according to said second non-zero capacity, is accomplished by:
   throttling the DIMM at a reduced frequency;
   retesting, at said reduced frequency, the portion of the DIMM containing the memory address where the memory error was detected; and upon successful retesting making the DIMM available on-line at said reduced frequency.

9. A memory system programmable to dynamically reconfigure storage or channel capacities, the system comprising:
- a dual in-line memory module (DIMM) configurable according to a first non-zero capacity;
- a memory controller operatively coupled with said DIMM to configure the DIMM according to said first non-zero capacity;
- a machine readable tangible medium including a program, said program being executable by a machine to perform a method comprising:
  - detecting a memory error for a memory address in a portion of the DIMM;
  - reducing the first non-zero capacity to determine a second non-zero capacity;
  - causing the memory controller to dynamically reconfigure the DIMM according to said second non-zero capacity, wherein said first and second non-zero capacities represent alternative channel capacities of the DIMM.

10. The system of claim 9 wherein said first and second non-zero capacities represent alternative data storage capacities of the DIMM.

11. The system of claim 10 wherein causing the memory controller to dynamically reconfigure the DIMM according to said second non-zero capacity, is accomplished by:
- mapping the portion of the DIMM containing the memory address where the memory error was detected as unavailable; and
- taking said portion, but not the entire DIMM off-line.

12. The system of claim 9 wherein causing the memory controller to dynamically reconfigure the DIMM according to said second non-zero capacity, is accomplished by:
- throttling the DIMM at a reduced frequency;
- retesting, at said reduced frequency, the portion of the DIMM containing the memory address where the memory error was detected; and upon successful retesting
- making the DIMM available on-line at said reduced frequency.

* * * * *